ature to several hundred degrees. A hydrocarbon solvent is a preferred solvent, and after concentration. The reaction is carried out at −80° C. to 100° C. preferably at a temperaature about room temperature. If necessary, the reaction mixture is heated.

United States Patent
Tamaru et al.

[15] 3,660,028
[45] May 2, 1972

[54] AMMONIA SYNTHESIS CATALYST

[72] Inventors: Kenzi Tamaru; Takaharu Onishi, both of Kanagawa; Mitsuyuki Soma; Mizuo Sudo, both of Tokyo, all of Japan

[73] Assignee: Tokyo University, Tokyo, Japan

[22] Filed: Feb. 6, 1970

[21] Appl. No.: 9,426

[30] Foreign Application Priority Data

Feb. 6, 1969 Japan..................................44/8940

[52] U.S. Cl...............................23/198, 252/428, 252/447
[51] Int. Cl..................................................C01c 1/04
[58] Field of Search.....................252/428, 447; 23/198, 199

[56] References Cited

UNITED STATES PATENTS

| | | | |
|---|---|---|---|
| 3,084,206 | 4/1963 | Yeo et al............................252/447 X |
| 3,176,048 | 3/1965 | Yeo et al............................252/447 X |
| 3,340,323 | 9/1967 | Magerlein et al..................252/447 X |
| 1,052,815 | 2/1913 | Greenstreet........................23/198 X |
| 2,138,122 | 11/1938 | Roberts..............................23/198 X |

*Primary Examiner*—Patrick P. Garvin
*Attorney*—Wenderoth, Lind & Ponack

[57] ABSTRACT

The present invention provides a novel catalyst and improved process for direct synthesis of ammonia from nitrogen and hydrogen which comprises employing a complex of alkali metal or organo-alkali metal with graphite, said organo-alkali metal being an alkali metal benzophenone ketyl or an alkali metal salt of an aromatic hydrocarbon.

10 Claims, No Drawings

AMMONIA SYNTHESIS CATALYST

DETAILED EXPLANATION OF THE INVENTION

This invention concerns catalyst for a direct ammonia synthesis from hydrogen and nitrogen gases, a process therefor and a process for synthesizing ammonia from hydrogen and nitrogen gases by employing the above-mentioned catalyst.

As the conventional process for synthesizing ammonia adapted to work industrially, there are the Haber-Bosch method, the Claude method and the Mont Cenis method. As the main catalyst, in the former two methods a fused iron oxide is employed, and in the latter cyano-iron complex salts are used as the same as the above. All of the above-mentioned catalysts consist of iron compounds as a main portion and some kinds of promoters as a minor portion. They are used after performing a reduction treatment. Furthermore, these catalysts lose the activity owing to a slight amount of oxygen and/or carbon monoxide.

The catalysts of this invention are quite new species different from the conventional ones in their compositions, and consist of such compounds as are prepared from (1) one or more of alkali metals in the Periodic Table, Group I or organo-alkali metal compounds and (2) graphite.

These complex compounds correspond to "electron donor-acceptor complexes" or "charge transfer complexes" in which the graphite is an electron acceptor and the alkali metals and the organo-alkali metal compounds are electron donors.

The said alkali metals include lithium, sodium, potassium, rubidium and cesium.

The organo-alkali metal compounds include alkali-metal benzophenone ketyls and alkali metal salts of aromatic hydrocarbons such as naphthalene and anthracene, where alkali metals are lithium, sodium, potassium, rubidum and cesium.

The catalyst of this invention adsorbs a considerable amount of hydrogen and nitrogen gases, and converts catalytically a mixture of hydrogen and nitrogen gases into ammonia at desirable temperatures. No ammonia is formed, however, over alkali metals, organo-alkali metal compounds or graphite alone. In addition, the decomposition of ammonia proceeds reversibly over the catalyst of this invention, in the manner similar to the general ammonia synthesis catalysts. Thus, a high conversion into ammonia is realized at a side of lower temperatures and higher pressures, where an equilibrium ammonia concentration is high.

These catalysts are prepared, for example, by the following procedures:

i. At least one of alkali metals is mixed with graphite at a temperature above the melting point of alkali metals.

ii. one of the alkali metals or organo-alkali metal compounds and graphite are deposited over carriers with large surface area, and the resulting mass is heat-treated.

iii. at least one of the organo-alkali metal compounds is mixed with graphite in a polar solvent such as tetrahydrofuran, diglyme or dimethoxyethane, and thereafter the solvent is evaporated.

But the other preparations of these catalysts should not be excluded from this invention.

They need neither any promotors nor the reduction treatment for activating the catalyst by means of hydrogen. Furthermore, their catalytic activities do not considerably decrease in the presence of oxygen and/or carbon monoxide.

The following examples are given in illustration of this invention and are not intended as limitations thereof.

EXAMPLE 1

A catalyst of graphite-alkali metal complex was obtained by a reaction of about 2 g of graphite powder with about 2 g of alkali metal in a U-shaped glass tube reactor at 300° C. in a vacuum.

A mixture of gaseous hydrogen and nitrogen was circulated in the reactor kept at a given temperature at a rate of 12 ml/min and the circulating system had a volume of 114 ml. The surface area of the complex was estimated to be about 500 m²/g by the BET method using nitrogen.

The reaction product, ammonia, was collected by a U-shaped glass tube in the circulating system cooled by liquid nitrogen and analyzed by infrared spectrometry and gas chromatogrpahy. The result is shown in the following Table 1.

The activity of the complex was not decreased appreciably in the presence of oxygen and carbon monoxide.

TABLE 1

| Catalyst | Partial pressure of introduced gas $N_2$ $H_2$ (cm. Hg) | | Reaction temp. °C. | Yield of ammonia after 12 hours (ml s.t.p.) | $NH_3/N_2$ |
|---|---|---|---|---|---|
| K-Graphite | 5.8 | 9.2 | 300 | 1.9 | 0.24 |
| Na-Graphite | 5.8 | 9.2 | 300 | 2.1 | 0.27 |

EXAMPLE 2

The catalyst was prepared from 1 g of an alkali metal and 2 g of graphite in the same manner as described in Example 1 and by using the resulting catalyst, ammonia was synthesized. The result is shown in the Table 2. The surface area of the catalyst was about 20 m²/g and the volume of the reaction system was about 310 ml.

TABLE 2

| Catalyst | Partial pressure of introduced gas $N_2$ $H_2$ (cm. Hg) | | Reaction temp. °C. | Yield of ammonia after 20 hours (ml s.t.p.) | $NH_3/N_2$ |
|---|---|---|---|---|---|
| K-Graphite | 8 | 24 | 300 | 0.06 | 0.002 |
|  | 8 | 24 | 325 | 0.11 | 0.004 |
|  | 8 | 24 | 350 | 0.23 | 0.008 |
| Rb-Graphite | 12 | 38 | 300 | 0.39 | 0.008 |

What is claimed is:

1. In a process for the synthesis of ammonia from nitrogen and hydrogen at elevated temperature, the improvement which comprises: employing as a catalyst a graphite complex with an alkali metal or an organo alkali metal compound selected from the group consisting of alkali metal benzophenone ketyls and alkali metal salts of aromatic hydrocarbons.

2. A process according to claim 1 wherein the alkali metal is selected from the group consisting of lithium, sodium, potassium, rubidium and cesium.

3. A process according to claim 2 wherein the graphite-alkali metal complex is obtained by heating a mixture of graphite and alkali metal to at least the melting point of the alkali metal.

4. A process according to claim 3 wherein the graphite-alkali metal complex is obtained by reacting about 2 parts by weight graphite powder with about 2 parts by weight alkali metal at about 300° C. in a vacuum.

5. A process according to claim 3 wherein the graphite-alkali metal complex is obtained by reacting about 2 parts by weight of graphite with about 1 part by weight of an alkali metal at about 300° C.

6. A process according to claim 3 wherein the ammonia reaction temperature is between about 300° and 350° C.

7. A process according to claim 2 wherein the hydrocarbon is selected from the group consisting of naphthalene and anthracene.

8. A process according to claim 2 wherein the graphite-alkali metal complex is prepared by admixing graphite with a member selected from the group consisting of alkali metal benzophenone ketyls and alkali metal salts of aromatic hydrocarbons in a solvent selected from the group consisting of tetrahydrofuran, diglyme and dimethoxyethane and thereafter evaporating the solvent.

9. A catalyst for synthesizing ammonia which consisting essentially of a complex compound prepared by mixing at least one organo-alkali metal compound selected from the group consisting of alkali metal benzophenonone ketyls and alkali metal salts of aromatic hydrocarbons with graphite in a polar solvent selected from the group consisting of tetrahydrofuran, diglyme and dimethoxyethane, and thereafter evaporating the solvent.

10. The catalyst of claim 9 wherein the aromatic hydrocarbon is selected from the group consisting of naphthalene and anthracene.

* * * * *